United States Patent [19]

Jubb et al.

[11] Patent Number: 5,356,557
[45] Date of Patent: Oct. 18, 1994

[54] ELECTROOPTICAL SYSTEM

[75] Inventors: Raymond Jubb, Darmstadt; Ulrich Finkenzeller, Plankstadt; Eike Poetsch, Mühltal; Stefan Wilhelm, Heppenheim, all of Fed. Rep. of Germany

[73] Assignee: Merck Patent Gesellschaft Mit Beschrankter Haftung, Fed. Rep. of Germany

[21] Appl. No.: 851,562

[22] Filed: Mar. 13, 1992

[30] Foreign Application Priority Data

Mar. 13, 1991 [DE] Fed. Rep. of Germany ....... 4108091
Mar. 13, 1991 [DE] Fed. Rep. of Germany ....... 4108448

[51] Int. Cl.$^5$ .................. C09K 19/52; G02F 1/13
[52] U.S. Cl. .................. 252/299.01; 359/52; 359/102
[58] Field of Search .......... 252/299.01; 359/51, 359/52, 62, 102, 104, 106

[56] References Cited

U.S. PATENT DOCUMENTS

| | | | |
|---|---|---|---|
| 4,435,047 | 3/1984 | Fergason | 350/334 |
| 4,671,611 | 6/1987 | Allemand et al. | 350/96.23 |
| 4,688,900 | 8/1987 | Doane et al. | 350/351 |
| 4,950,052 | 8/1990 | Fergason et al. | 350/334 |
| 4,992,201 | 2/1991 | Pearlman | 252/299.1 |
| 5,122,295 | 6/1992 | Weber et al. | 252/299.01 |
| 5,122,297 | 6/1992 | Reiffenrath et al. | 252/299.63 |
| 5,167,860 | 12/1992 | Sawada et al. | 252/299.63 |

FOREIGN PATENT DOCUMENTS

| | | |
|---|---|---|
| 0272585 | 6/1988 | European Pat. Off. . |
| 0313053 | 4/1989 | European Pat. Off. . |

OTHER PUBLICATIONS

J. L. West, "Phase Separation of Liquid Crystals in Polymers," Mol. Cryst. Liq Cryst. Inc. Nonlin, Opt., 157:427–441 (1988).

"Polymer Dispersed Liquid Crystals" West in Liquid Crystalline Polymers, edited by Weissis & Ober., pp. 475–495, 1990.

*Primary Examiner*—Shean Wu

[57] ABSTRACT

The invention relates to an electrooptical system which contains, between 2 electrode layers, a liquid-crystal mixture and a further optically transparent polymeric medium, one of the electrode layers being formed as an active matrix having nonlinear addressing elements integrated into the pixel, while the other electrode layer forms the counterelectrode, whose liquid-crystal molecules have an irregular alignment in the switched-off state, in which one of the refractive indices of the liquid-crystal mixture essentially corresponds to the refractive index of the medium $n_m$ and/or in which the quotient of the mass of the liquid-crystal mixture and the mass of the optically transparent medium is 1.5 or more, and which has reduced transmission in one of the two switching states compared with the other state, irrespective of the polarization of the incident light, where the liquid-crystal mixture contains at least one compound of the formula I, defined herein, and, in order to increase the solubility of the liquid-crystal mixture in the precursor, the precursor of the medium contains between 0.1% and 95.0% of a component A which comprises one or more fluorinated, oligo-fluorinated or perfluorinated monomers, oligomers and/or prepolymers.

29 Claims, No Drawings

ELECTROOPTICAL SYSTEM

Summary of the Invention

The invention relates to an electrooptical system which contains, between 2 electrode layers, a liquid-crystal mixture and a further optically transparent polymeric medium, one of the electrode layers being formed as an active matrix having nonlinear addressing elements integrated into the pixel, while the other electrode layer forms the counterelectrode, whose liquid-crystal molecules have an irregular alignment in the switched-off state, in which one of the refractive indices of the liquid-crystal mixture essentially corresponds to the refractive index of the medium $n_m$ and/or in which the quotient of the mass of the liquid-crystal mixture and the mass of the optically transparent medium is 1.5 or more, and which has reduced transmission in one of the two switching states compared with the other state, irrespective of the polarization of the incident light.

The optically transparent medium may contain liquid-crystal microdroplets which are delimited from one another or may form a sponge-like, 3-dimensional network whose pores, which are interconnected to a greater or lesser extent, contain the liquid crystal. The term liquid-crystal microdroplets characterizes small liquid-crystal compartments which are delimited from one another, but in no way necessarily have a spherical shape and may instead have an irregular shape and/or be deformed.

If the optically transparent medium contains liquid-crystal microdroplets, it is denoted below as a microdroplet system; if, by contrast, it has a sponge-like, 3-dimensionally crosslinked structure, the medium is characterized by the term network.

NCAP and PDLC films (NCAP=nematic curvilinear aligned phases, PDLC=polymer dispersed liquid crystal) are examples of microdroplet systems. Such arrangements are described, for example, in U.S. Pat. No. 4,435,047, EP 0,272,582, U.S. Pat. No. 4,688,900, U.S. Pat. No. 4,671,611 and Mol. Cryst. Liq. Cryst. Inc. Nonlin. Optics 157 (1988) 427. By contrast, the arrangement described in EP 0,313,053 is a network or PN system (PN=polymer network), in which the optically transparent medium has a sponge-like network structure.

The nonlinear elements used to produce the active matrix can have 2 or 3 connections. The elements having 2 connections are, for example, $\alpha$-Si:H diodes (N. Szydlo et al., Proc. 3rd Int. Display Res. Conf., Kobe; SID Los Angeles, 1983, p. 416), NIN$\alpha$-Si:H diodes (Z. Yaniv et al., Conf. Rec. 1985 Intern. Display Research Conference, IEEE, New York, 1985, p. 76), $\alpha$-Si:H ring diodes (S. Togashi et al., Proceedings of the 4th International Display Research Conference, SEE, Paris, 1984, p. 141), MIM or MSI diodes (metal-insulator-metal, metal-silicon nitride-indium tin oxide; D. R. Baraff et al., Digest SID International Symposium, Los Angeles, 1980, p. 200; M. Suzuki et al., Proceedings of the 6th International Display Research Conference, Japan Display '86, 1986, p. 72) or ZnO varistors (D. E. Castleberry et al., SID '82 Digest, 1982, p. 246). The nonlinear elements having 3 connections are thin-film transistors (TFT), of which several types are discussed, differing through the semiconductor material used (for example $\alpha$-Si:H, p-Si, CdSe, Te and further materials; see, for example, P.M. Knoll, Displays, Heidelberg 1986, p. 216; T. Nishimura, Mat. Res. Soc. Symp. Proc. 33(1984) 221; C. S. Bak et al., Mat. Res. Soc. Symp. Proc. 33 (1984) 215; W. G. Hawkins et al., Mat. Res. Soc. Symp. Proc. 33 (1984) 231; M. Matsuura et al., SID 1983 Symposium Digest, 1983, p. 148).

If nonlinear elements having 3 connections are used, only one connection is generally necessary for the counterelectrode, while the counterelectrode is usually also scanned in the case of active matrix addressing based on elements having 2 connections. However, active matrix addressing based on elements having 2 connections in which only one electrode is scanned has also been proposed (Y. Baron et al., Proceedings of the 6th International Research Conference 1986, Japan Display '86, p. 86), and furthermore the use of TFTs as an element having only 2 connections has also been discussed (C. Hilsum et al., Displays, January 1986, p. 37).

Further details on the addressing of liquid-crystal displays by an active matrix of nonlinear elements are given, for example, in A. H. Firester, SID, 1987, Society for Information Display Seminar, Seminar 5: Active Matrices for Liquid Crystals, E. Kaneko, Liquid Crystal Displays, KTK Scientific Publishers, Tokyo, Japan, 1987, Chapters 6 and 7, and P.M. Knoll, Displays, Heidelberg, 1986, p. 216 ff.

Polarizers are not required for operating microdroplet or network systems, and these systems thus have high transmission. Due to these favorable transmission properties, microdroplet or network systems provided with active matrix addressing have been proposed, in particular, for projection applications, but also for displays having a high information content and further applications.

The liquid-crystal mixtures used in the production of microdroplet or network systems must satisfy a very wide variety of demands. Thus, one of the refractive indices of the liquid crystal in microdroplet systems is selected so that it more or less coincides with the refractive index of the medium $n_m$. In network systems, matching of the refractive indices is not absolutely necessary since the liquid-crystal content in the light-modulating layer is usually very much greater, but may be carried out in order to increase the light transmission and the contrast.

The liquid-crystal mixture may be dielectrically positive or dielectrically negative. The use of dielectrically positive liquid-crystal mixtures is preferred, and in this case the ordinary refractive index $n_o$ is generally matched to the refractive index of the matrix $n_m$. Other matchings are described in the literature (see, for example, EP 0,272,585) or can be indicated without difficulty by a person skilled in the art.

The matching of the refractive indices means that, in the addressed state, incident light sees virtually no difference in refractive index between the aligned liquid-crystal molecules and the medium, and the arrangement appears transparent. Furthermore, the liquid crystal should have a high clearing point, a broad nematic range, no smectic phases down to low temperatures and high stability and should be characterized by an optical anisotropy $\Delta n$ and flow viscosity $\Delta$ which can be optimized with respect to the particular application and by a high dielectric anisotropy $\epsilon\Delta$.

A number of materials and processes have been proposed hitherto for production of the microdroplet or network system. Thus, for example, NCAP films are obtained by the process described in U.S. Pat. No. 4,435,047 by intimately mixing the encapsulating polymer material, such as, for example, polyvinyl alcohol, the liquid-crystal mixture and a carrier material, such as, for example, water, in a colloid mill. The carrier material is then removed, for example by drying. By contrast, in the PIPS (polymerization induced phase separation) process described in Mol. Cryst. Liq. Cryst. Inc. Nonlin. Optics 157 (1988), 427, and in the process indicated in EP 0,272,585, the liquid-crystal mixture is first mixed with monomers or oligomers of the film-forming polymer before the polymerization is initiated. The microdroplet system described in Mol. Cryst. Liq. Cryst. Inc. Nonlin. Opt. 157 (1988), 427, is based on an epoxide film, while the arrangement indicated in EP 0,272,585 is an acrylate system.

Addressing of the microdroplet or network system by means of an active matrix has a further crucial criterion in addition to the requirements mentioned above which must be satisfied by the liquid-crystal mixture, the monomers or prepolymers and the cured polymer. This is associated with the fact that, with respect to the particular active nonlinear element, each pixel is a captive load which is charged in the rhythm of the addressing cycle. It is of crucial importance here that the voltage applied to an addressed pixel only drops by a small amount until the pixel is recharged in the next addressing cycle. A quantitative measure of the drop in voltage applied to a pixel is the so-called holding ratio (HR), which is defined as the ratio between the drop in voltage over a pixel in the nonaddressed state and the applied voltage; a method of determining the HR is indicated, for example, in B. Rieger et al., Conference Proceedings of the Freiburger Arbeitstagung Flüssigkristalle [Freiburg Liquid-Crystals Conference], Freiburg 1989. Electrooptical systems having a low or relatively low HR have inadequate contrast.

Although considerable efforts have already been made to optimize microdroplet and network systems with respect to the liquid-crystal mixture used and the polymer system, only few investigations are found in the literature on electrooptical systems based on microdroplet or network systems and having active matrix addressing, and no new concepts have hitherto been proposed for the provision of electrooptical systems having a high HR. The systems indicated hitherto do not satisfactorily meet the requirements for favorable properties of the liquid-crystal mixture used, the monomers or oligomers and the cured polymer while at the same time having a high HR of the overall system.

A further problem is frequently that the miscibility of the liquid-crystal mixture with the monomers, oligomers and/or prepolymers of the polymer used to form the microdroplet or network system is too low, which considerably impairs the preparation of PN systems and, in the case of microdroplet matrix systems, considerably limits, in particular, the use of PIPS technology.

A further particular disadvantage is that the liquid-crystal mixture or the individual components of the liquid-crystal mixture are frequently characterized by excessive and/or significantly temperature-dependent solubility in the cured, microdroplet matrix- or network-forming polymer. If, for example, the solubility or the temperature dependence of the solubility of one or some components differs relatively significantly from that of the other components, the physical properties of the mixture and in particular also the refractive indices $n_e$ (extraordinary refractive index) and $n_o$ (ordinary refractive index) can be significantly affected, which can upset the matching of $n_o$ or $n_e$ or of another refractive index of the liquid-crystal mixture to $n_m$, which results in an impairment of the optical properties of the system. The "bleeding" described in EP 0 357,234, by which the liquid-crystal droplets, when the matrix film is subjected to mechanical load, tends, at least in part, to dissolve at the film surface or in the matrix with diffusion of the liquid crystal, is promoted by high solubility of the liquid-crystal mixture in the cured polymer.

There is thus a great demand for electrooptical systems which satisfy the outlined requirements to a large extent and, in particular, have a high HR and are distinguished by good miscibility of the particular liquid-crystal mixture with the monomers, oligomers and/or prepolymers of the polymer used and by low solubility of the liquid-crystal mixture in the cured polymer.

An object of the invention, therefore, is to provide electrooptical systems of this type and mixtures for the production of such systems which contain monomers, oligomers and/or prepolymers of the polymer used and a liquid-crystal mixture.

Upon further study of the specification and appended claims, further objects and advantages of this invention will become apparent to those skilled in the art.

It has been found that these objects can be achieved if the liquid-crystal mixture contains one or more compounds of the formula I

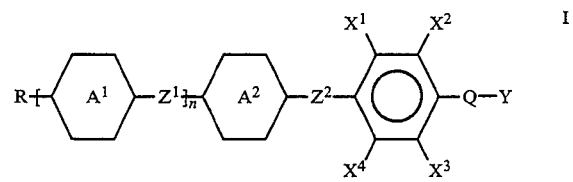

in which $Z^1$ and $Z^2$, independently of one another, are a single bond, —CH$_2$CH$_2$—, —COO—, —OCO— or —C≡C—,

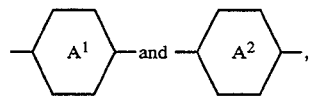

independently of one another, are trans-1,4-cyclohexylene, 1,4-phenylene, 2-fluoro-1,4-phenylene, 3-fluoro-1,4-phenylene, 2,3-difluoro-1,4-phenylene, or 3,5-difluoro-1,4-phenylene or 2,3,5-trifluoro-1,4-phenylene and one of

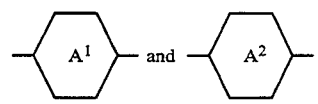

is alternatively pyrimidine-2,5-diyl, pyridine-2,5-diyl or trans-1,3-dioxane-2,5-diyl, $X^1$, $X^2$, $X^3$ and $X^4$, independently of one another, are H or F, Q is CF$_2$, OCF$_2$, C$_2$F$_4$, OC$_2$F$_4$, or a single bond, Y is H, F or Cl n is 0, 1 or 2, and R is alkyl having up to 12 carbon atoms in which, in addition, one or two non-adjacent $CH_2$ groups may be replaced by —O— and/or —CH=CH—, and if the precursor of the polymeric medium contains, in order increase the solubility of the liquid-crystal mixture in the precursor, between 0.1% and 95.0% of a component A which comprises one or more fluorinated, oligofluorinated or perfluorinated monomers, oligomers and/or prepolymers.

The invention thus relates to an electrooptical system which contains, between 2 electrode layers, a liquid-crystal mixture and a further optically transparent polymeric medium, one of the electrode layers being formed as an active matrix having nonlinear addressing elements integrated into the pixel, while the other electrode layer forms the counterelectrode, whose liquid-crystal molecules have an irregular alignment in the switched-off state, in which one of the refractive indices of the liquid-crystal mixture essentially corresponds to the refractive index of the medium $n_m$ and/or in which the quotient of the mass of the liquid-crystal mixture and the mass of the optically transparent medium is 1.5 or more, and which has reduced transmission in one of the two switching states compared with the other state, irrespective of the polarization of the incident light, where the liquid-crystal mixture contains one or more compounds of the formula I and the precursor of the polymer medium contains, in order to increase the solubility of the liquid-crystal mixture in the precursor, between 0.1% and 95.0% of a component A which comprises one or more fluorinated, oligofluorinated or perfluorinated monomers, oligomers and/or prepolymers.

For reasons of simplicity, Phe below denotes 1,4-phenylene, Phe.2F denotes 2-fluoro-1,4-phenylene, Phe.3F denotes 3-fluoro-1,4-phenylene, Cyc denotes trans-1,4cyclohexylene, Pyr denotes pyrimidine-2,5-diyl and Pyd denotes pyridine-2,5-diyl, the two abbreviations Pyr and Pyd in each case covering the two possible positional isomers. Furthermore, Phe.(F) denotes a 1,4-phenylene group, which is unsubstituted or 2- or 3-monofluorinated. Phe.3F5F denotes a 3,5-difluoro-1,1,4-phenylene group, and Phe.2F3F and Phe.3F6F are defined analogously. Phe.2F3F5F is a 2,3,5-trifluorinated 1,4-phenylene group, and Phe.2F3F5F and Phe.2F3F5F6F, the latter as a tetrafluorinated 1,4-phenylene group, are defined analogously. Phe.(F)$_x$denotes a 1,4-phenylene group which may be unfluorinated or fluorinated in the 2-, 3-, 5- and-/or 6-position.

Electrooptical systems whose liquid-crystal mixture contains one or more bicyclic compounds of the formula I2 are preferred:

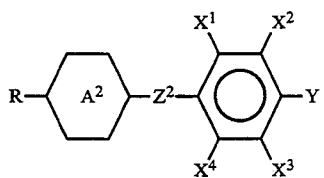

In the compounds of the formula I2, R is preferably alkyl or alkoxy having 1-10, but in particular 1-8, carbon atoms, straight-chain radicals being preferred. Further preferred are n-alkoxyalkyl compounds and in particular n-alkoxymethyl and n-alkoxyethyl compounds.

$Z^2$ is preferably —$CH_2CH_2$—, —COO— or a single bond, in particular a single bond or —$CH_2CH_2$—, and very particularly a single bond. Y is —F, —Cl, —$OCHF_2$, —$OCF_3$ or —$CF_3$ and in particular —F, —Cl, —$OCF_3$ or —$CF_3$.

Compounds of the formula I2 in which at least one of $X^1$, $X^2$, $X^3$ and $X^4$ and in particular of $X^1$, $X^2$ and $X^3$ is not H are particularly preferred. Very particularly preferred compounds of the formula I2 are those in which $X^1=X^2=H$, $X^3=F$ and Y=—F, —Cl, —$OCHF_2$, —$OCF_3$ or —$CF_3$.

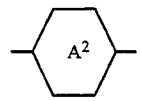

is preferably Cyc, Phe. (F), Phe.3F5F, Phe.2F3F, Pyr, Pyd or Dio and in particular Cyc, Phe.(F), Phe.3F5F, Phe.2F3F, Pyr or Pyd.

Very particular preference is given to electrooptical systems whose liquid-crystal mixture contains one or more bicyclic compounds selected from the following smaller group of compounds of the formulae I2-1 –I2-115:

| | |
|---|---|
| R-Cyc -Phe-F | I2-1 |
| R-Cyc-Phe.3F-F | I2-2 |
| R-Cyc-Phe.3F5F-F | I2-3 |
| R-Cyc-Phe-Cl | I2-4 |
| R-Cyc-Phe.3F-Cl | I2-5 |
| R-Cyc-Phe.3F5F-Cl | I2-6 |
| R-Cyc-Phe-$OCHF_2$ | I2-7 |
| R-Cyc-Phe.3F-$OCHF_2$ | I2-8 |
| R-Cyc-Phe.3F5F-$OCHF_2$ | I2-9 |
| R-Cyc-Phe-$OCF_3$ | I2-10 |
| R-Cyc-Phe.3F-$OCF_3$ | I2-11 |
| R-Cyc-Phe.3F5F-$OCF_3$ | I2-12 |
| R-Cyc-Phe-$CF_3$ | I2-13 |
| R-Cyc-Phe.3F-$CF_3$ | I2-14 |
| R-Cyc-Phe.3F5F-$CF_3$ | I2-15 |
| R-Phe -Phe-F | I2-16 |
| R-Phe-Phe.3F-F | I2-17 |
| R-Phe-Phe.3F5F-F | I2-18 |
| R-Phe.3F5F-Phe-F | I2-19 |
| R-Phe-Phe-Cl | I2-20 |

| | |
|---|---|
| R-Phe-Phe.3F-Cl | I2-21 |
| R-Phe-Phe.3F5F-Cl | I2-22 |
| R-Phe.3F5F-Phe-Cl | I2-23 |
| R-Phe-Phe-OCHF₂ | I2-24 |
| R-Phe-Phe.3F-OCHF₂ | I2-25 |
| R-Phe-Phe.3F5F-OCHF₂ | I2-26 |
| R-Phe.3F5F-Phe-OCHF₂ | I2-27 |
| R-Phe-Phe-OCF₃ | I2-28 |
| R-Phe-Phe.3F-OCF₃ | I2-29 |
| R-Phe-Phe.3F5F-OCF₃ | I2-30 |
| R-Phe.3F5F-Phe-OCF₃ | I2-31 |
| R-Phe-Phe-CF₃ | I2-32 |
| R-Phe-Phe.3F-CF₃ | I2-33 |
| R-Phe-Phe.3F5F-CF₃ | I2-34 |
| R-Phe.3F5F-Phe-CF₃ | I2-35 |
| R-Cyc-CH₂CH₂-Phe-F | I2-36 |
| R-Cyc-CH₂CH₂-Phe.3F-F | I2-37 |
| R-Cyc-CH₂CH₂-Phe.3F5F-F | I2-38 |
| R-Cyc-CH₂CH₂-Phe-Cl | I2-39 |
| R-Cyc-CH₂CH₂-Phe.3F-Cl | I2-40 |
| R-Cyc-CH₂CH₂-Phe.3F5F-Cl | I2-41 |
| R-Cyc-CH₂CH₂-Phe-OCHF₂ | I2-42 |
| R-Cyc-CH₂CH₂-Phe.3F-OCHF₂ | I2-43 |
| R-Cyc-CH₂CH₂-Phe.3F5F-OCHF₂ | I2-44 |
| R-Cyc-CH₂CH₂-Phe-OCF₃ | I2-45 |
| R-Cyc-CH₂CH₂-Phe.3F-OCF₃ | I2-46 |
| R-Cyc-CH₂CH₂-Phe.3F5F-OCF₃ | I2-47 |
| R-Cyc-CH₂CH₂-Phe-CF₃ | I2-48 |
| R-Cyc-CH₂CH₂-Phe.3F-CF | I2-49 |
| R-Cyc-CH₂CH₂-Phe.3F5F-CF₃ | I2-50 |
| R-Cyc-COO-Phe-F | I2-51 |
| R-Cyc-COO-Phe.3F-F | I2-52 |
| R-Cyc-COO-Phe.3F5F-F | I2-53 |
| R-Cyc-COO-Phe-Cl | I2-54 |
| R-Cyc-COO-Phe.3F-Cl | I2-55 |
| R-Cyc-COO-Phe.3F5F-Cl | I2-56 |
| R-Cyc-COO-Phe-OCHF₂ | I2-57 |
| R-Cyc-COO-Phe.3F-OCHF₂ | I2-58 |
| R-Cyc-COO-Phe.3F5F-OCHF₂ | I2-59 |
| R-Cyc-COO-Phe-OCF₃ | I2-60 |
| R-Cyc-COO-Phe.3F-OCF₃ | I2-61 |
| R-Cyc-COO-Phe. 3F5F-OCF₃ | I2-62 |
| R-Cyc-COO-Phe-CF₃ | I2-63 |
| R-Cyc-COO-Phe.3F-CF₃ | I2-64 |
| R-Cyc-COO-Phe.3F5F-CF₃ | I2-65 |
| R-Phe-COO-Phe-F | I2-66 |
| R-Phe-COO-Phe.3F-F | I2-67 |
| R-Phe-COO-Phe.3F5F-F | I2-68 |
| R-Phe.3F5F-COO-Phe-F | I2-6 |
| R-Phe-COO-Phe-Cl | I2-70 |
| R-Phe-COO-Phe.3F-Cl | I2-71 |
| R-Phe-COO-Phe.3F5F-Cl | I2-72 |
| R-Phe.3F5F-COO-Phe-Cl | I2-73 |
| R-Phe-COO-Phe-OCHF₂ | I2-74 |
| R-Phe-COO-Phe.3F-OCHF₂ | I2-75 |
| R-Phe-COO-Phe.3F5F-OCHF₂ | I2-76 |
| R-Phe.3F5F-COO-Phe-OCHF₂ | I2-77 |
| R-Phe-COO-Phe-OCF₃ | I2-78 |
| R-Phe-COO-Phe.3F-OCF₃ | I2-79 |
| R-Phe-COO-Phe.3F5F-OCF₃ | I2-80 |
| R-Phe.3F5F-COO-Phe-OCF₃ | I2-81 |
| R-Phe-COO-Phe-CF₃ | I2-82 |
| R-Phe-COO-Phe.3F-CF₃ | I2-83 |
| R-Phe-COO-Phe.3F5F-CF₃ | I2-84 |
| R-Phe.3F5F-COO-Phe-CF₃ | I2-85 |
| R-Pyr-Phe-F | I2-86 |
| R-Pyr-Phe.3F | I2-87 |
| R-Pyr-Phe.3F5F-F | I2-88 |
| R-Pyr-Phe-Cl | I2-89 |
| R-Pyr-Phe.3F-Cl | I2-90 |
| R-Pyr-Phe.3F5F-Cl | I2-91 |
| R-Pyr-Phe-OCHF₂ | I2-92 |
| R-Pyr-Phe.3F-OCHF₂ | I2-93 |
| R-Pyr-Phe.3F5F- | I2-94 |
| R-Pyr-Phe.3F-OCF₃ | I2-96 |

| | |
|---|---|
| R-Pyr-Phe.3F5F-OCF$_3$ | I2-97 |
| R-Pyr-Phe-CF$_3$ | I2-98 |
| R-Pyr-Phe.3F-CF$_3$ | I2-99 |
| R-Pyr-Phe.3F5F-CF | I2-100 |
| R-Pyd-Phe-F | I2-101 |
| R-Pyd-Phe.3F-F | I2-102 |
| R-Pyd-Phe.3F5F-F | I2-103 |
| R-Pyd-Phe-C | I2-104 |
| R-Pyd-Phe.3F-Cl | I2-105 |
| R-Pyd-Phe.3F5F-Cl | I2-106 |
| R-Pyd-Phe-OCHF$_2$ | I2-107 |
| R-Pyd-Phe.3F-OCHF$_2$ | I2-108 |
| R-Pyd-Phe.3F5F-OCHF$_2$ | I2-109 |
| R-Pyd-Phe-OCF$_3$ | I2-110 |
| R-Pyd-Phe.3F-OCF$_3$ | I2-111 |
| R-Pyd-Phe.3F5F-OCF$_3$ | I2-112 |
| R-Pyd-Phe-CF$_3$ | I2-113 |
| R-Pyd-Phe.3F-CF$_3$ | I2-114 |
| R-Pyd-Phe.3F5F-CF$_3$ | I2-115 |

Preference is furthermore given to electrooptical systems whose liquid-crystal mixture contains one or more tricyclic compounds of the formula I3:

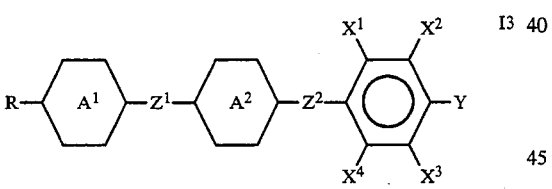

In the compounds of the formula I3, R is preferably n-alkyl, or n-alkoxy having 1–10 carbon atoms, and in addition n-alkoxymethyl or n-alkoxyethyl having 1–8 carbon atoms and n-alkenyl having up to 7 carbon atoms.

Very particular preference is given to compounds of the formula I3 in which R is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl or propoxyethyl. $Z^1$ and $Z^2$ in the compounds of the formula I3 are, independently of one another, preferably —CH$_2$CH$_2$—, —COO— or a single bond and in particular —CH$_2$CH$_2$— or a single bond. Particular preference is given to compounds of the formula I3 in which at least one of Z and $Z^2$ is a single bond. Y is —F, —Cl, —OCHF$_2$, —OCF$_3$ or —CF$_3$ and in particular —F, —Cl, —OCHF$_2$ or —OCF$_3$. Compounds of the formula I3 in which $X^4$=H and $X^1$, $X^2$ and/or $X^3$=F are preferred.

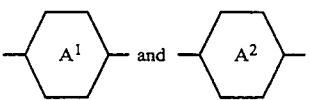

independently of one another, Cyc, Phe.(F), Phe.2F3F, Phe.3F5F, Phe.2F3F5F, Pyr, Pyd or Dio and in particular Cyc, Phe.(F), Phe.2F3F, Phe.3F5F, Phe.2F3F5F, Pyr or Pyd.

Electrooptical systems whose liquid-crystal mixture contains one or more compounds selected from the following smaller group of compounds of the formulae I3-1–I3-160 are particularly preferred:

| | |
|---|---|
| R-Cyc-Cyc-Phe-F | I3-1 |
| R-Cyc-Cyc-Phe.3F-F | I3-2 |
| R-Cyc-Cyc-Phe.3F5F | F I3-3 |
| R-Cyc-Cyc-Phe-Cl | I3-4 |
| R-Cyc-Cyc-Phe.3F-Cl | I3-5 |
| R-Cyc-Cyc-Phe.3F5F-Cl | I3-6 |
| R-Cyc-Cyc-Phe-OCHF$_2$ | I3-7 |
| R-Cyc-Cyc-Phe.3F-OCHF$_2$ | I3-8 |
| R-Cyc-Cyc-Phe.3F5F-OCHF$_2$ | I3-9 |
| R-Cyc-Cyc-Phe-OCF$_3$ | I3-10 |
| R-Cyc-Cyc-Phe.3F-OCF$_3$ | I3-11 |
| R-Cyc-Cyc-Phe.3F5F-OCF$_3$ | I3-12 |
| R-Cyc-Cyc-Phe-CF$_3$ | I13-13 |
| R-Cyc-Cyc-Phe.3F-CF$_3$ | I3-14 |
| R-Cyc-Cyc-Phe.3F5F-CF$_3$ | I3-15 |
| R-Cyc-Phe-Phe-F | I3-16 |
| R-Cyc-Phe-Phe.3F-F | I3-17 |
| R-Cyc-Phe-Phe.3F5F-F | I3-18 |
| R-Cyc-Phe.3F5F-Phe-F | I3-19 |
| R-Cyc-Phe-Phe-Cl | I3-20 |
| R-Cyc-Phe-Phe.3F-Cl | I3-21 |
| R-Cyc-Phe-Phe.3F5F-Cl | I3-22 |
| R-Cyc-Phe.3F5F-Phe-Cl | I3-23 |
| R-Cyc-Phe-Phe-OCHF$_2$ | I3-24 |
| R-Cyc-Phe-Phe.3F-OCHF$_2$ | I3-25 |
| R-Cyc-Phe-Phe.3F5F-OCHF$_2$ | I3-26 |
| R-Cyc-Phe. 3F5F-Phe-OCHF$_2$ | I3-27 |
| R-Cyc-Phe-Phe-OCF$_3$ | I3-28 |
| R-Cyc-Phe-Phe.3F-OCF$_3$ | I3-29 |
| R-Cyc-Phe-Phe.3F5F-OCF$_3$ | I3-30 |

| | |
|---|---|
| R-Cyc-Phe.3F5F-Phe-OCF₃ | I3-31 |
| R-Cyc-Phe-Phe-CF₃ | I3-32 |
| R-Cyc-Phe-Phe.3F-CF₃ | I3-33 |
| R-Cyc-Phe-Phe.3F5F-CF₃ | I3-34 |
| R-Cyc-Phe.3F5F-Phe-CF₃ | I3-35 |
| R-Phe-Phe-Phe-F | I3-36 |
| R-Phe-Phe-Phe.3F-F | I3-37 |
| R-Phe-Phe-Phe.3F5F- | I3-38 |
| R-Phe-Phe.3F5F-Phe-F | I3-39 |
| R-Phe-Phe-Phe-Cl | I3-40 |
| R-Phe-Phe-Phe.3F-Cl | I3-41 |
| R-Phe-Phe-Phe.3F5F-Cl | I3-42 |
| R-Phe-Phe.3F5F-Phe-Cl | I3-43 |
| R-Phe-Phe-Phe OCHF₂ | I3-44 |
| R-Phe-Phe-Phe.3F-OCHF₂ | I3-45 |
| R-Phe-Phe.3F5F-Phe-OCHF₂ | I3-46 |
| R-Phe-Phe-Phe.3F5F-OCHF₂ | I3-47 |
| R-Phe-Phe-Phe-OCF₃ | I3-48 |
| R-Phe-Phe-Phe.3F-OCF₃ | I3-49 |
| R-Phe-Phe.3F5F-Phe-OCF₃ | I3-50 |
| R-Phe-Phe-Phe.3F5F-OCF₃ | I3-51 |
| R-Phe-Phe-Phe-CF₃ | I3-52 |
| R-Phe-Phe-Phe.3F-CF₃ | I3-53 |
| R-Phe-Phe.3F5F-Phe-CF₃ | I3-54 |
| R-Phe-Phe-Phe.3F5F-CF₃ | I3-55 |
| R-Cyc-Pyr-Phe-F | I3-56 |
| R-Cyc-Pyr-Phe.3F-F | I3-57 |
| R-Cyc-Pyr-Phe.3F5F-F | I3-58 |
| R-Cyc-Pyr-Phe-Cl | I3-59 |
| R-Cyc-Pyr-Phe.3F-Cl | I3-60 |
| R-Cyc-Pyr-Phe.3F5F-Cl | I3-61 |
| R-Cyc-Pyr-Phe-OCHF₂ | I3-62 |
| R-Cyc-Pyr-Phe.3F-OCHF₂ | I3-63 |
| R-Cyc-Pyr-Phe-OCF₃ | I3-65 |
| R-Cyc-Pyr-Phe.3F-OCF₃ | I3-66 |
| R-Cyc-Pyr-Phe.3F5F-OCF₃ | I3-67 |
| R-Cyc-Pyr-Phe-CF₃ | I3-68 |
| R-Cyc-Pyr-Phe.3F-CF₃ | I3-69 |
| R-Cyc-Pyr-Phe.3F5F-CF₃ | I3-70 |
| R-Cyc-Pyd-Phe. | I3-71 |
| R-Cyc-Pyd-Phe.3F-F | I3-72 |
| R-Cyc-Pyd-Phe.3F5F-F | I3-73 |
| R-Cyc-Pyd-Phe-Cl | I3-74 |
| R-Cyc-Pyd-Phe.3F-Cl | I3-75 |
| R-Cyc-Pyd-Phe.3F5F-Cl | I3-76 |
| R-CyC-Pyd-Phe-OCHF₂ | I3-77 |
| R-Cyc-Pyd-Phe.3F-OCHF₂ | I3-78 |
| R-Cyc-Pyd-Phe.3F5F-OCHF₂ | I3-79 |
| R-Cyc-Pyd-Phe-OCF₃ | I3-80 |
| R-Cyc-Pyd-Phe.3F-OCF₃ | I3-80 |
| R-Cyc-Pyd-Phe.3F-OCF₃ | I3-81 |
| R-Cyc-Pyd-Phe.3F5F-OCF₃ | I3-82 |
| R-Cyc-Pyd-Phe-CF₃ | I3-83 |
| R-Cyc-Pyd-Phe.3F-CF₃ | I3-84 |
| R-Cyc-Pyd-Phe.3F5F-CF₃ | I3-85 |
| R-Pyr-Phe-Phe-F | I3-86 |
| R-Pyr-Phe-Phe.3F-F | I3-87 |
| R-Pyr-Phe-Phe.3F5F-F | I3-88 |
| R-Pyr-Phe-Phe-Cl | I3-89 |
| R-Pyr-Phe-Phe.3F-Cl | I3-90 |
| R-Pyr-Phe-Phe.3F5F-Cl | I3-91 |
| R-Pyr-Phe-Phe-OCHF₂ | I3-92 |
| R-Pyr-Phe-Phe.3F-OCHF₂ | I3-93 |
| R-Pyr-Phe-Phe-OCF₃ | I3-95 |
| R-Pyr-Phe-Phe.3F-OCF₃ | I3-96 |
| R-Pyr-Phe-Phe.3F5F-OCF₃ | I3-97 |
| R-Pyr-Phe-Phe-CF | I3-98 |
| R-Pyr-Phe-Phe.3F-CF₃ | I3-99 |
| R-Pyr-Phe-Phe.3F5F-CF₃ | I3-100 |
| R-Pyd-Phe-Phe-F | I3-101 |
| R-Pyd-Phe-Phe.3F-F | I3-102 |
| R-Pyd-Phe-Phe.3F5F-F | I3-103 |
| R-Pyd-Phe-Phe-Cl | I3-104 |
| R-Pyd-Phe-Phe.3F-Cl | I3-105 |
| R-Pyd-Phe-Phe.3F5F-Cl | I3-106 |

| | |
|---|---|
| R-Pyd-Phe-Phe-OCHF$_2$ | I3-107 |
| R-Pyd-Phe-Phe.3F-OCHF$_2$ | I3-108 |
| R-Pyd-Phe-Phe.3F5F-OCHF$_2$ | I3-109 |
| R-Pyd-Phe-Phe-OCF$_3$ | I3-110 |
| R-Pyd-Phe-Phe.3F-OCF$_3$ | I3-111 |
| R-Pyd-Phe-Phe.3F5F-OCF$_3$ | I3-112 |
| R-Pyd-Phe-Phe-CF$_3$ | I3-113 |
| R-Pyd-Phe-Phe.3F-CF$_3$ | I3-114 |
| R-Pyd-Phe-Phe.3F5F-CF$_3$ | I3-115 |
| R-Cyc-Cyc-CH$_2$CH$_2$-Phe-F | I3-116 |
| R-Cyc-Cyc-CH$_2$CH$_2$-Phe.3F-F | I3-117 |
| R-Cyc-Cyc-CH$_2$CH$_2$-Phe.3F5F-F | I3-118 |
| R-Cyc-Cyc-CH$_2$CH$_2$-Phe-Cl | 3-119 |
| R-Cyc-Cyc-CH$_2$CH$_2$-Phe.3F-Cl | I3-120 |
| R-Cyc-Cyc-CH$_2$CH$_2$-Phe.3F5F-Cl | I3-121 |
| R-Cyc-Cyc-CH$_2$CH$_2$-Phe-OCHF$_2$ | I3-122 |
| R-Cyc-Cyc-CH$_2$CH$_2$-Phe.3F-OCHF$_2$ | I3-123 |
| R-Cyc-Cyc-CH$_2$CH$_2$-Phe.3F5F-OCHF$_2$ | I3-124 |
| R-Cyc-Cyc-CH$_2$CH$_2$-Phe-OCF$_3$ | I3-125 |
| R-Cyc-Cyc-CH$_2$CH$_2$-Phe.3F-OCF$_3$ | I3-126 |
| R-Cyc-Cyc-CH$_2$CH$_2$-Phe.3F5F-OCF$_3$ | I3-127 |
| R-Cyc-Cyc-CH$_2$-Phe-CF$_3$ | I3-128 |
| R-Cyc-Cyc-CH$_2$CH$_2$-Phe.3F-CF$_3$ | I3-129 |
| R-Cyc-Cyc-CH$_2$CH$_2$-Phe.3F5F-CF$_3$ | I3-130 |
| R-Cyc-CH$_2$CH$_2$-Phe-Phe-F | I3-131 |
| R-Cyc-CH$_2$CH$_2$-Phe-Phe.3F-F | I3-132 |
| R-Cyc-CH$_2$CH$_2$-Phe-Phe.3F 5F-F | I3-133 |
| R-Cyc-CH$_2$CH$_2$-Phe-Phe-Cl | I3-134 |
| R-Cyc-CH$_2$CH$_2$-Phe-Phe.3F-Cl | I3-135 |
| R-Cyc-CH$_2$CH$_2$-Phe-Phe.3F5F-Cl | I3-136 |
| R-Cyc-CH$_2$CH$_2$-Phe-Phe-OCHF$_2$ | I3-137 |
| R-Cyc-CH$_2$CH$_2$-Phe-Phe.3F-OCHF$_2$ | I3-138 |
| R-Cyc-CH$_2$CH$_2$-Phe-Phe.3F5F-OCHF$_2$ | I3-139 |
| R-Cyc-CH$_2$CH$_2$-Phe-Phe-OCF$_3$ | I3-140 |
| R-Cyc-CH$_2$CH$_2$-Phe-Phe.3F-OCF$_3$ | I3-141 |
| R-Cyc-CH$_2$CH$_2$-Phe-Phe.3F5F-OCF$_3$ | I3-142 |
| R-Cyc-CH$_2$CH$_2$ -Phe-Phe-CF$_3$ | I3-143 |
| R-Cyc-CH$_2$CH$_2$-Phe-Phe.3F-CF$_3$ | I3-144 |
| R-Cyc-CH$_2$CH$_2$CH$_2$-Phe-Phe.3F5F-CF3 | I3-145 |
| R-Cyc-Phe-COO-Phe-F | I3-146 |
| R-Cyc-Phe-COO-Phe.3F-F | I3-147 |
| R-Cyc-Phe-COO-Phe.3F5F-F | I3-148 |
| R-Cyc-Phe-COO-Phe-Cl | I3-149 |
| R-Cyc-Phe-COO-Phe.3F-Cl | I3-150 |
| R-Cyc-Phe-COO-Phe. 3F5F-Cl | I3-151 |
| R-Cyc -Phe -COO-Phe-OCHF$_2$ | I3-152 |
| R-Cyc-Phe-COO-Phe.3F-OCHF$_2$ | I3-153 |
| R-Cyc-Phe-COO-Phe.3F5F-OCHF$_2$I3-154 | |
| R-Cyc-Phe-COO-Phe-OCF$_3$ | I3-155 |
| R-Cyc-Phe-COO-Phe.3F-OCF$_3$ | I3-156 |
| R-Cyc-Phe-COO-Phe.3F5F-OCF$_3$ | I3-157 |
| R-Cyc -Phe-COO-Phe-CF$_3$ | I3-158 |
| R-Cyc-Phe-COO-Phe.3F-CF$_3$ | I3-159 |
| R-Cyc-Phe-COO-Phe.3F5F-CF$_3$ | I3-160 |

Electrooptical systems whose liquid-crystal mixtures contain one or more compounds of the formula I2 or I3 in which $X^2$ and/or $X^3$ are F have advantageous values for the dielectric anisotropy and frequently also favorable values for the elastic constants. Electro-optical systems whose liquid-crystal mixture contains one or more compounds of the formulae I2-86–I2-115 and I3-56–I3-115 have particularly advantageous values for $\Delta\epsilon$. Electrooptical systems whose liquid-crystal mixture contains at least one bicyclic compound of the formula I2 and at least one tricyclic compound of the formula I3 are frequently characterized by particularly advantageous properties. Liquid-crystal mixtures which contain one or more compounds of the formula I3 which are laterally at least difluorinated frequently have a particularly favorable miscibility with the monomers, oligomers and/or prepolymers described below and are preferred.

Preference is furthermore given to electrooptical systems whose liquid-crystal mixture contains one or more tetracyclic compounds of the formula I4:

$$R-\left(A^1\right)-Z^1-\left(A^1\right)-Z^1-\left(A^2\right)-Z^2-\underset{X^4\ X^3}{\overset{X^1\ X^2}{\bigcirc}}-Y \qquad I4$$

In the compounds of the formula I4, R is preferably n-alkyl or n-alkoxy having 1–10 carbon atoms, or alternatively n-alkoxymethyl or n-alkoxyethyl having 1–8 carbon atoms.

Very particular preference is given to compounds of the formula I4 in which R is methyl, ethyl, propyl, butyl, pentyl, hexyl, heptyl, octyl, nonyl, decyl, methoxy, ethoxy, propoxy, butoxy, pentoxy, hexoxy, heptoxy or octoxy.

In the compounds of the formula I4, preferably not more than 2 and in particular only one of the bridges $Z^1$ and $Z^2$ is not a single bond.

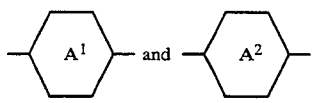

are preferably, independently of one another, Cyc, Phe.2F, Phe.3F, Phe, Pyr or Pyd. Compounds of the formula I4 in which at least one of

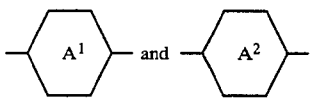

is 2F or Phe.3F are preferred. The proportion by weight of the compounds of the formula I4 in the liquid-crystal mixture of the electrooptical systems according to the invention is preferably not excessive and is in particular less than 20%, it frequently being preferred to use laterally fluorinated compounds of the formula I4.

Electrooptical systems whose liquid-crystal mixture contains one or more compounds selected from the following smaller group of compounds of the formulae I4-1 –I4-15 are particularly preferred:

| | |
|---|---|
| R-Cyc-Phe.(F)-Phe.(F)-Phe.(F)$_x$-F | I4-1 |
| R-Cyc-Phe.(F)-Phe.(F)-Phe.(F)$_x$-Cl | I4-2 |
| R-Cyc-Phe.(F)-Phe.(F)-Phe.(F)$_x$-OCHF$_2$ | I4-3 |
| R-Cyc-Phe.(F)-Phe.(F)-Phe.(F)$_x$-OCF$_3$ | I4-4 |
| R-Cyc-Phe.(F)-Phe.(F)-Phe.(F)$_x$-CF$_3$ | I4-5 |
| R-Cyc-Cyc-Phe.(F)-Phe.(F)$_x$-F | I4-6 |
| R-Cyc-Cyc-Phe.(F)-Phe.(F)$_x$-Cl | I4-7 |
| R-Cyc-Cyc-Phe.(F)-Phe.(F)$_x$-OCHF$_2$ | I4-8 |
| R-Cyc-Cyc-Phe.(F)-Phe.(F)$_x$-OCF$_2$ | I4-9 |
| R-Cyc-Cyc-Phe.(F)-Phe.(F)$_x$-CF$_3$ | I4-10 |
| R-Cyc-Cyc-Cyc-Phe.(F)$_x$-F | I4-11 |
| R-Cyc-Cyc-Cyc-Phe.(F)$_x$-Cl | I4-12 |
| R-Cyc-Cyc-Cyc-Phe.(F)$_x$-OCHF$_2$ | I4-13 |
| R-Cyc-Cyc-Cyc-Phe.(F)$_x$-OCF$_3$ | I4-14 |
| R-Cyc-Cyc-Cyc-Phe.(F)$_x$-CF$_3$ | I4-15 |

It has been shown that the electrooptical systems whose liquid-crystal mixture contains one or more compounds of the formula I and in particular one or more compounds of the formulae I2-1-I2-115, I3-1-I3-160 and I4-1-I4-15 and whose medium is obtained by polymerization of a precursor which contains between 0.1% and 95.0% of a component A which comprises one or more fluorinated, oligofluorinated or perfluorinated aliphatic monomers, oligomers and/or prepolymers have particularly favorable properties.

These systems are characterized by advantageous values for the threshold voltage, high UV and heat stability, a favorable operating temperature range, favorable values for the temperature dependence of the electrooptical parameters, high contrast and in particular a high HR.

The liquid-crystal mixture is distinguished by good miscibility with the precursor, frequently even at room temperature or at slightly elevated temperatures, and only in a few cases is warming to temperatures of above 60° C. necessary in order to achieve adequate miscibility of precursor and liquid-crystal mixture.

It has been found that monomers, oligomers and/or prepolymers of component A of the precursor preferably contain, in order to increase the solubility of the liquid-crystal mixture in the precursor, a structural element of the formula II or of the formula III

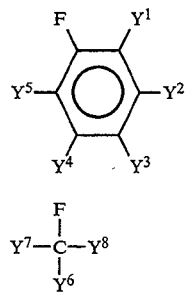

in which up to 4, but preferably at least one, of the radicals $Y^1-Y^5$ and up to two of the radicals $Y^6-Y^8$, independently of one another, are H or F, at least one and up to 4 of the radicals $Y^1-Y^5$ and at least one and up to 3 of the radicals $Y^6-Y^8$, independently of one another, are alkylene groups having 1–30 carbon atoms in which, in addition, 1–15 $CH_2$ groups, independently of one another, may be replaced by —O—, —CO—, —COO—, —OCO—, —S—, —CHhalogen—, —C(halogen)$_2$— or substituted or unsubstituted, saturated or aromatic, cyclic diyl groups, where O and/or S are not linked directly to one another, and/or a single bond, and up to 3 of the radicals $Y^1-Y^5$ and up to 2 of the radicals $Y^6-Y^8$ are alkyl groups having 1–30 carbon atoms in which, in addition, 1–15 $CH_2$ groups, independently of one another, may be replaced by —O—, —CO—, —COO—, —OCO—, —S—, —CHhalogen—, —C(halogen)$_2$— or substituted or unsubstituted, saturated or aromatic, cyclic diyl groups, where O and/or S are not linked directly to one another.

The cyclic diyl groups mentioned above and below are preferably groups with 6 ring atoms. Particularly preferred are trans-1,4-cyclohexylene group wherein one or two $CH_2$-groups can each be replaced by NH, S, O, an unsubstituted 1,4-phenylene group wherein up to three CH-groups can each be replaced by N, or a 1,4-phenylene group substituted by up to 4 F atoms.

Group II (i.e., formula II) may be a terminal or non-terminal group of the particular monomer, oligomer and/or prepolymer. A terminal group II may be defined as one in which 4 of the radicals $Y^1-Y^5$ are not polymerizable, i.e., contain no polymerizable group, while one of the radicals $Y^1-Y^5$ is an alkylene group or a single bond which connects group II to a polymerizable radical. By contrast, at least 2 of the radicals $Y^1$–$Y^5$ in non-terminal groups II are alkylene groups and/or single bonds which connect group II to polymerizable radicals.

Group III (i.e., formula III) may likewise be a terminal or non-terminal group of the particular monomer, oligomer and/or prepolymer. A terminal group III may be defined as being one in which 2 of the radicals $Y^6$–$Y^8$ are not polymerizable, i.e., contain no polymerizable group, while one of the radicals $Y^6$–$Y^8$ is an alkylene group or a single bond which connects group III to a polymerizable radicals. By contrast, at least 2 of the radicals $Y^6$–$Y^8$ in non-terminal groups III are alkylene groups and/or single bonds which connect group III to polymerizable radicals.

Since the above-defined alkylene groups and/or one or more single bonds connect the structural elements group II or group III to the polymerizable radical(s) P, the alkylene groups or the single bond are also referred to below as intermediate group Z.

The polymerizable radicals contain one or more polymerizable groups which are characterized by the number of linking points. Thus, for example, the preferred substituted or unsubstituted vinyl groups

and the very particularly preferred substituted or unsubstituted acryloyloxy groups

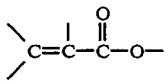

and the likewise preferred substituted or unsubstituted epoxide groups

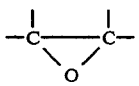

and the particularly preferred substituted or unsubstituted epichlorohydrin groups

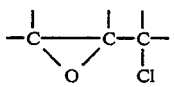

have 2 linking points, whereas the

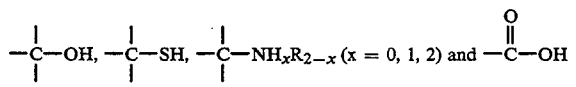

groups are preferred groups containing one linking point.

The above polymerizable groups may be substituted or unsubstituted, preferred substituents being the radicals indicated under the formula II or under the formula III. The olefinically unsaturated polymerizable groups may be either acyclic or cyclic, the cyclic groups preferably being derived from cyclopentene, cyclopentadiene, cyclohexene, cyclohexadiene and cyclic acrylic groups.

Monomers, oligomers and/or prepolymers of component A of the precursor and further monomers, oligomers and/or prepolymers (component B) present in the precursor generally contain at least 2 linking points, in which case linear structures are produced on polymerization. By contrast, the polymerization of monomers, oligomers and/or prepolymers containing 3 or more linking points gives spatially crosslinked polymers. Spatially crosslinked polymers are also obtained on copolymerization of monomers, oligomers and/or prepolymers containing one or two linking points and monomers, oligomers and/or prepolymers containing 3 linking points.

Component B contains non-fluorinated monomers, oligomers and/or prepolymers like for example, ene-type compounds like acrylates, etc., isocyanates, urethanes, thiols, hydroxyl compounds or compounds of other compound classes familiar to the polymer chemist. These compounds should usually exhibit at least two linking points, i.e., for example, an ene-group (=double bonding), two SH or OH groups, etc., in order to produce linear structures. Crosslinking agents with at least 3 linking groups like, for example, di- or poly-enes, di- or poly-acrylates, multifunctional thiols, ene-ols, ene-thiols, etc., are often preferred. Preferably, the precursor of the polymeric medium contains 0.1–75.0 % of component B.

Before the structures obtained on polymerization and their effect on the stability of the electrooptical system and the solubility of liquid-crystal mixture are described in greater detail, the terminal groups II and III should first be characterized in greater detail, a distinction being made between terminal and non-terminal groups.

a) Terminal groups II and III

In the terminal groups II, at least one and in particular at least 2 of the radicals $Y^1$–$Y^5$ are preferably F.

In the terminal groups III, at least one and in particular at least 2 of the radicals $Y^6$–$Y^8$ are preferably F. One, 2 or 3 and in particular one or 2 of the radicals $Y^1$–$Y^5$ and one or 2 of the radicals $Y^6$–$Y^8$ may also be alkyl groups having 1–30, in particular 1–20, carbon atoms in which, independently of one another, 1–15 and in particular 1–10 $CH_2$ groups may also be replaced by —O—, —CO—, —COO—, —OCO—, —S—, —CHhalogen—, —C(halogen)$_2$— or substituted or unsubstituted, saturated or aromatic, cyclic diyl groups, where O and/or S are not linked directly to one another. At least one of the alkyl groups is preferably an at least partially halogenated and in particular fluorinated alkyl, alkoxy or oxyalkyl group, very particular preference being given to the following meanings:

(O)CF$_2$H, (O)CFClH, (O)CF$_2$Cl, (O)CF$_3$, (O)C$_2$F$_3$H$_2$, (O)C$_2$F$_4$H,
(O)C$_2$F$_5$, (O)C$_2$F$_4$Cl, (O)C$_3$F$_4$H$_3$, (O)C$_3$F$_5$H$_2$, (O)C$_3$F$_6$H, (O)C$_3$F$_7$,
(O)C$_3$F$_5$Cl$_2$, (O)C$_3$F$_3$Cl$_2$H$_2$, (O)C$_4$F$_5$H$_4$, (O)C$_4$F$_6$H$_3$, (O)C$_4$H$_7$H$_2$,
(O)C$_4$F$_8$H, (O)C$_4$F$_9$, (O)C$_5$F$_5$H$_6$, (O)C$_5$F$_6$H$_5$, (O)C$_5$F$_7$H$_4$, (O)C$_5$F$_8$H$_3$,
(O)C$_5$F$_9$H$_2$, (O)C$_5$F$_{10}$H, (O)C$_5$F$_{11}$, (O)C$_6$F$_8$H$_5$, (O)C$_6$F$_9$H$_4$, (O)C$_6$F$_{10}$H$_3$, (O)C$_6$F$_{11}$H$_2$, (O)C$_6$F$_{12}$H, (O)C$_6$F$_{13}$, (O)C$_7$F$_9$H$_6$, (O)C$_7$F$_{10}$H$_5$,
(O)C$_7$F$_{11}$H$_4$, (O)C$_7$F$_{12}$H$_3$, (O)C$_7$F$_{11}$ClH$_3$, (O)C$_7$F$_{12}$H$_3$, (O)C$_7$F$_{13}$H$_2$,
(O)C$_7$F$_{14}$Cl, (O)C$_7$F$_{15}$, (O)C$_8$F$_{12}$H$_5$, (O)C$_8$F$_{13}$H$_4$, (O)C$_8$F$_{14}$H$_3$,
(O)C$_8$F$_{15}$H$_2$, (O)C$_8$F$_{16}$H, (O)C$_8$F$_{17}$, (O)C$_9$F$_{15}$H$_4$, (O)C$_9$F$_{16}$H$_3$,
(O)C$_9$F$_{17}$H$_2$, (O)C$_9$F$_{18}$H, (O)C$_9$F$_{19}$, (O)C$_{10}$F$_{18}$H$_3$, (O)C$_{10}$F$_{19}$H$_2$,
(O)C$_{10}$F$_{19}$Cl$_2$, (O)C$_{10}$F$_{20}$H and (O)C$_{10}$F$_{21}$, wherein (O) represents a single bond or —O—. The above particularly preferred terminal groups may be straight-chain or branched, but are preferably branched.

Particularly good solubility of the liquid-crystal mixture in the precursor of the polymeric medium is observed if component A contains more than 5% and in particular not less than 10% of monomers, oligomers and/or prepolymers which contain a group II in which at least 3 of the radicals $Y^1$-$Y^5$ are each F, or contains a group III in which at least 2 of the radicals $Y^6$-$Y^8$ are F. Very particular preference is given to monomers, oligomers and or/or prepolymers which contain a group II in which $Y^1=Y^2=Y^3=Y^4=F$ or in which 3 of the radicals $Y^1$-$Y^5$ are F and one of the other two radicals is one of the above-mentioned preferred polyfluorinated alkyl or alkoxy radicals. Very particular preference is also given to monomers, oligomers and/or prepolymers which contain a group III in which $Y^6=Y^7=F$ and $Y^8$ is one of the above-mentioned preferred polyfluorinated alkyl or alkoxy radicals.

b) Non-terminal groups II and III

In the non-terminal groups of the formula II, 2 or more, but in particular 2 or 3, and very particularly 2, of the radicals $Y^1$-$Y^5$ are alkylene groups or single bonds which connect group II to polymerizable radicals. Of the other 2 or 3 of the 5 radicals $Y^1$-$Y^3$, at least one radical is preferably F. Very particular preference is given to non-terminal groups II in which 2 of the remaining 2 or 3 radicals are F or in which one of these 2 or 3 radicals is F and the others are each one of the preferred polyfluorinated alkyl or alkoxy radicals mentioned under a).

In the non-terminal groups III, 2 or 3, but in particular 2, of the radicals $Y^6$-$Y^8$ are alkylene groups or single bonds which connect the group III to polymerizable radicals. Preference is given to non-terminal groups in which 2 of the 3 groups $Y^6$-$Y^8$ are alkylene groups and/or single bonds and the other group is F.

The compounds having terminal groups I and III contain one and the compounds having non-terminal groups I and III contain at least two radicals which each contain at least one polymerizable group which is bonded directly or via an intermediate group to the respective group II or III. These intermediate groups may be alkylene groups having 1-30, in particular 1-20, very particularly 1-15, carbon atoms in which, in addition, in particular 1-10 CH$_2$ groups, independently of one another, may be replaced by —O—, —CO—, —COO—, —OCO—, —S—, —CHhalogen—, —C(halogen)$_2$— or substituted or unsubstituted, saturated or aromatic, cyclic diyl groups, where O and/or S are not linked directly to one another, and/or are one or more single bonds. Very particular preference is given to straight-chain or branched alkylene groups having 1-10 carbon atoms and in particular to methylene, ethylene, 1,3-propylene, 1,4-butylene, 1,5-pentylene, 1,6-hexylene, 1,7-heptylene, 1,8-octylene, 1,9-nonylene and 1,10-decylene.

Preference is furthermore given to methyleneoxy, ethyleneoxy, 1,3-propyleneoxy, 1,4-butyleneoxy, 1,5-pentyleneoxy, 1,6-hexyleneoxy, 1,7-heptyleneoxy, 1,8-octyleneoxy and 1,9-nonyleneoxy. Preference is furthermore also given to alkylene groups having 1-10 carbon atoms in which up to 3 non-adjacent CH$_2$ groups have been substituted by —O—, —CO—, —COO— and/or —OCO—. Said preferred groups may furthermore, in particular, also be monosubstituted or oligosubstituted by halogen and particularly preferably by F.

The intermediate group may also contain one or more alicyclic, substituted or unsubstituted, saturated or aromatic, cyclic 1,4-diyl groups, such as, for example, 1,4-cyclohexylene or 1,4-phenylene groups, it being possible for the latter also to be substituted and in particular fluorinated. The incorporation of rings into the intermediate group or intermediate groups may be advantageous, in particular, for matching the refractive index of the polymeric medium to one of the refractive indices of the liquid-crystal mixture. The term fluorinated, oligofluorinated or perfluorinated aliphatic monomers, oligomers and/or prepolymers is drawn broadly and also includes compounds containing a structural element III which contains one or more cyclic groups in the intermediate group(s) and/or in the alkyl group(s).

The polymerizable group(s) P which is bonded via the intermediate groups Z to the group of the formula II or III is preferably one of the abovementioned polymerizable groups which contain two or one linking points. It is possible for only one polymerizable group P to be bonded via Z to the group of the formula II or III, schematically.

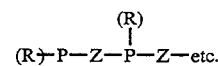

or 2 or more polymerizable groups to be present in one radical, schematically

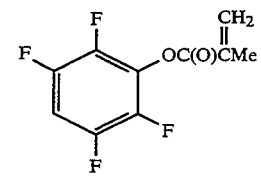

The polymerizable groups may be substituted or unsubstituted, the same substituents as in group II or III being. particularly suitable here. The substitution is indicated schematically by (R—)-.

Compounds of the type described which contain a structural element of the formula II or of the formula III and at least one polymerizable group are described in the literature, as are processes for their preparation.

Compounds of the following formula containing a group II which is not fully fluorinated are described, for example, in JP 62/160456.

The compounds below which contain a fully fluorinated group II (i.e. $Y^1=Y^2=Y^3=Y^4=F$) are described in:

JP 02/184 653

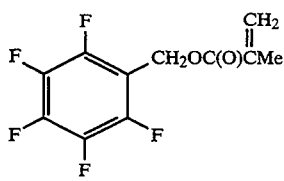

JP 57/067 536

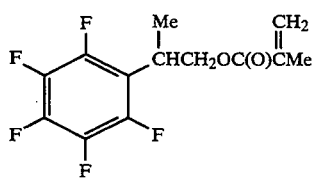

U.S. Pat. No. 3,544,535

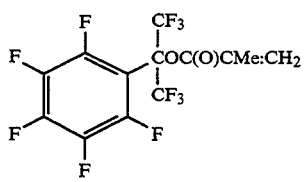

JP 63/202 605

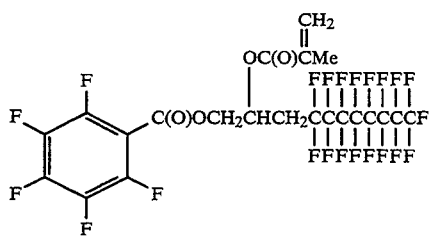

JP 01/236 205

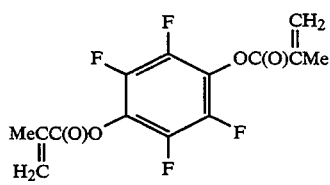

Above and below, Me represents a methyl group.

An example which may be mentioned of a monomer which contains the group II and contains 2 polymerizable radicals, each of which contains a polymerizable group, is the compound described in JP 01/236 205.

Some representative examples of acrylate-type monomers containing the group III are given below.

DE 34 06 587
JP 63/033 524

Angew. Makromol. Chem., 130, 137–46

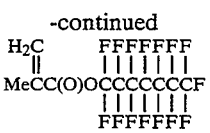

DE 23 11 277

H$_2$C:CMeC(O)OCHMeCH$_2$CF$_2$CF$_2$CF$_2$CF$_2$CF$_2$CF$_2$CF$_3$

U.S. Pat. No. 3,702,870

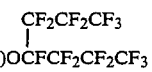

JP 88/157 939
JP 88/157 940
JP 88/157 941
U.S. Pat. No. 4,791,166

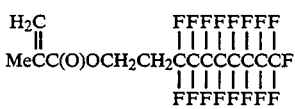

Vysokomol. Soedin, Ser. A, 21 (8), 1843–8

DE 23 50 571

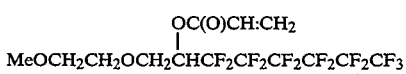

U.S. Pat. No. 3,544,537

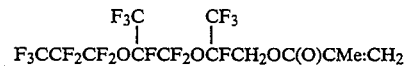

J. Fluorine Chem., 35 (3), 497–512

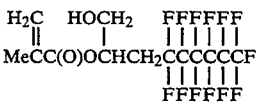

JP 61/275 365

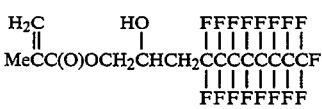

U.S. Pat. No. 4,638,040

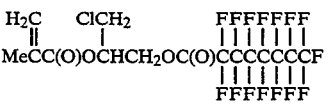

FR 1,473,451
GB 1,101,049

F$_3$CCF$_2$CF$_2$CF$_2$CF$_2$CF$_2$CF$_2$CF$_2$CH:CHCH$_2$OC(O)CMe:CH$_2$

JP 58/057 324

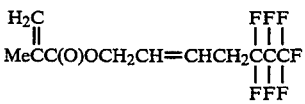

JP 58/057 327

-continued

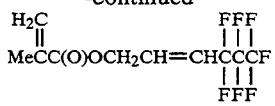

Examples of further interesting structures are the following:

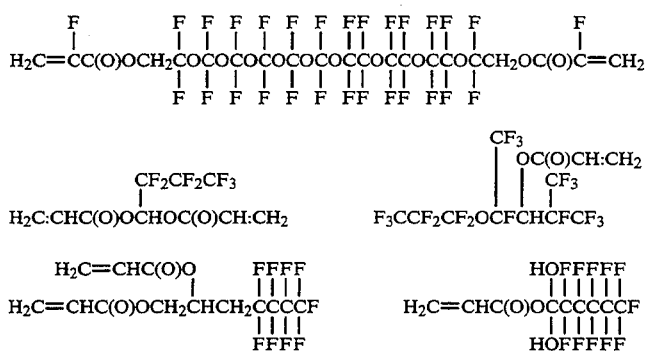

The compounds mentioned here as examples are intended merely to illustrate the invention and in no way as a limitation. A large number of further monomers, oligomers and/or prepolymers containing a structural element of the formula II or of the formula III and one or more of the abovementioned polymerizable groups is described in the literature. In addition, a person skilled in the art can, without any inventive step, indicate further combinations, as desired, of the described groups P, Z and the structural elements II and III, preparation being obvious by conventional methods of organic chemistry.

It has been found that the solubility of the liquid-crystal mixture which contains one or more compounds of the formula I and in particular contains more than 15%, very particularly more than 20%, of compounds of the formula I, in the precursor of the polymeric medium can be significantly increased if the precursor contains between 0.1% and 95% of a component A which comprises one or more compounds containing a structural element II or III. A significant improvement in miscibility is frequently observed even if the proportion by weight of component A is relatively low. This improvement is particularly apparent if the precursor contains prepolymers. In systems of this type, adequate miscibility is either only achieved at greatly elevated temperatures, or not at all, if no compounds containing structural elements of the formula II or III are added. By contrast, the addition of one or more compounds containing a structural element II or III frequently results in adequate and in most cases even good solubility, even when prepolymers are used, and even at room temperature or somewhat elevated temperatures of, for example, less than 80° C. in particular less than 60° C., very particularly less than 40° C. The proportion by weight of component A in the precursor is preferably greater than 3% and in particular not less than 5%. If prepolymers are used, a greater proportion of compounds containing a structural element of the formula II or III is frequently advantageous. The use of prepolymers is frequently preferred, in particular in acrylate systems, since this can reduce the shrinkage observed on curing of the system.

The increase in the solubility of the liquid-crystal mixture is frequently particularly pronounced if the precursor of the polymeric medium contains one or more monomers, oligomers and/or prepolymers containing the structural element II. This can presumably be explained by the structural similarity between the compounds of the formula I and in particular their terminal group

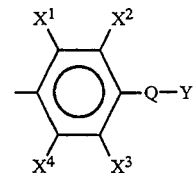

and the structural element II of the monomers, oligomers and/or prepolymers.

However, even if the precursor of the polymeric medium contains one or more monomers, oligomers and/or prepolymers containing the structural element III, a significant increase in the solubility of the liquid-crystal mixture in the precursor is observed, which can presumably be explained by the fact that the compounds of the formula I contain the terminal group -Q-Y and, in addition, are frequently laterally fluorinated, a great structural similarity existing between the group -Q-Y and the group III.

In order to reduce the solubility of the liquid-crystal mixture in the polymerized medium, the precursor of the medium preferably contains monomers, oligomers and/or prepolymers which contain at least 3 linking points. Monomers, oligomers and/or prepolymers of this type result in a spatially crosslinked structure of the polymeric medium, which increases the long-term stability of the electrooptical arrangement. These crosslinking agents may be either monomers, oligomers and/or prepolymers of component A which contain a structural element of the formula II or III and at least 3 linking points, or other monomers, oligomers and/or prepolymers containing at least 3 linking points, which are present in component B. Crosslinking agents which contain a structural element of the formula II are described above, and some acrylate compounds are listed by way of example.

Examples of other crosslinking agents are divinylbenzenes, ethylene diacrylates, 1,6-hexanediol diacrylates, bisphenol A diacrylates and dimethacrylates, trimethylolpropane diacrylate, pentaerythritol diacrylates, triethylene glycol diacrylates, ethylene glycol dimethacrylates, tripropylene glycol triacrylates, pentaerythritol triacrylates, pentaerythritol tetraacrylates, ditrimethylolpropane tetraacrylates and dipentaerythritol pentaacrylates and hexaacrylates.

In addition to these diacrylate and oligoacrylate compounds, many other polymerizable monomers, oligomers and/or prepolymers containing at least 3 linking points are known. Preference is given to those which can be obtained by combining the abovementioned preferred polymerizable structural elements.

The proportion by weight of the monomers, oligomers and/or prepolymers containing at least 3 linking points in the novel precursor of the optically transparent medium is preferably more than 5%, in particular more than 10%. Particularly favorable properties are exhibited by precursors at least some of whose monomers, oligomers and/or prepolymers of component A contain 3 or more linking points in addition to a structural element of the formula II or III. Precursors which contain such crosslinking agents in a proportion by weight of more than 5%, in particular not less than 10%, are particularly preferred.

The precursor can, in addition to component A, which comprises one or more fluorinated, oligofluorinated or perfluorated monomers, oligomers and/or prepolymers, and component B, which contains nonfluorinated monomers, oligomers and/or prepolymers, also contain further additives, such as, for example, dyes, pigments, UV stabilizers or further additives (component C). The proportion by weight of component C in the precursor is preferably 0–5% and is in particular not more than 2.5%.

In addition to the above-outlined requirements, the precursor must also be selected so that the refractive index of the polymeric, optically transparent medium essentially matches one of the refractive indices of the liquid-crystal mixture, generally the ordinary refractive index $n_o$. The optical properties of the monomers, oligomers and/or prepolymers of component A can be varied within a relatively broad range by means of the structural variation possibilities described, in particular the substituents $Y^1$–$Y^5$ and $Y^6$–$Y^8$. In addition, crosslinking agents of component B and further polymerizable monomers, oligomers and/or prepolymers, which can easily be selected by a person skilled in the art so that the optical matching of the refractive indices is optimized, can be added to the precursor.

The polymerization can proceed by various mechanisms, depending on the nature of the polymerizable groups, photoradical and photocationic and in particular photoradical, polymerization processes being preferred.

Particularly suitable photoinitiators which form free radicals are described in DE 41 04 183, while advantageous photoinitiators which form cations are described in JP 2/409225.

In order to optimize the properties of the cured polymer, it is frequently advantageous for the precursor to comprise more than one monomer, oligomer and/or prepolymer. The copolymerizable components of the precursor may contain either identical or different polymerizable groups. Thus, for example, acrylate systems containing a plurality of components having one or more acrylate groups are frequently preferred as precursors. Furthermore, precursors of this type which, in addition to one or more acrylate components, contain, for example, other olefinically unsaturated monomers, oligomers and/or prepolymers, such as, for example, vinyl esters, styrenes, etc., are frequently characterised by particularly advantageous properties. Further examples which may be mentioned are the copolymerization of olefinically mono- or polyunsaturated components of the precursor with dithiols or polythiols and/or dialcohols or polyalcohols and/or with olefinically unsaturated monomers, oligomers and/or prepolymers which additionally contain one or more —OH and/or —SH groups. The precursor systems described here should be understood as being illustrative and are merely intended to illustrate the invention without representing a limitation. On the basis of the present description, a person skilled in the art can easily indicate further precursors having different compositions, so that the properties of the precursor and in particular of the cured polymeric medium can be optimized with respect to the particular applications.

It has been found that, in order to increase the HR of the electrooptical system, it is advantageous to use photoinitiators which are copolymerizable with the monomers, oligomers and/or prepolymers of the precursor. The photoinitiator is thereby firmly anchored in the polymer during the polymerization, and an increase in the conductivity due to vagrant initiator molecules is suppressed. The knowledge that the use of copolymerizable initiators can increase the HR of systems as defined above is novel and inventive, and the use of such initiators and electrooptical systems as defined above, containing initiators of this type, are the subject-matter of this invention.

The mixture of the olefinically unsaturated precursor and the liquid-crystal mixture may optionally contain further additives, such as, for example, anti-oxidants, light stabilizers, optionally crosslinking agents for increasing the degree of crosslinking, etc. These additives should have the highest possible specific resistance and should have been appropriately purified. Since such additives are frequently only added in low or very low concentrations which are significantly lower than the initiator concentration, a relatively low value for the specific resistance can sometimes be tolerated without the HR of the electrooptical system dropping excessively; this is the case, in particular, if the concentration of the additives, based on the weight of the overall system, is less than 1.0% and in particular less than 0.5%.

In addition to compounds of the formula I, the liquid-crystal mixtures used in the electrooptical systems according to the invention may also contain nitrile compounds of the formulae III–VI

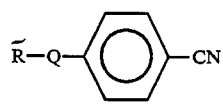

III

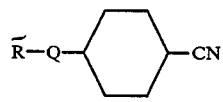

IV

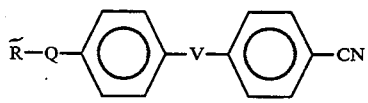

V

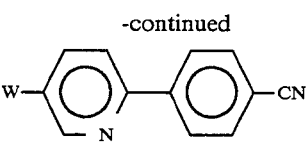

in which

R is in each case, independently of one another, an alkyl group having 1–15 carbon atoms in which, in addition, one or two non-adjacent CH₂ groups may be replaced by —O—, —CO— and/or —CH=CH—, V is a single bond, —COO— or —OOC—,

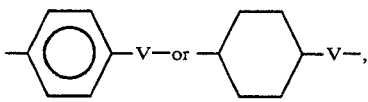

and
W is R̃,

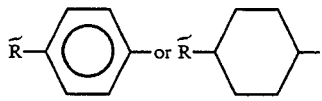

However, it has been shown that systems according to the invention whose liquid-crystal mixture contains more than 15% of nitrile compounds are frequently characterized by an inadequate HR value.

The proportion of nitrile compounds, based on the weight of the liquid-crystal mixture, is preferably small and is in particular not more than 10% and very particularly not more than 7.5%. Systems according to the invention whose liquid-crystal mixtures contain no nitrile compounds are very particularly preferred.

The proportion of the compounds of the formula I in the liquid-crystal mixtures used according to the invention is preferably not too small and is in particular more than 10% and very particularly more than 20%. Liquid-crystal mixtures containing more than 40% and in particular not less than 50% of compounds of the formula I are particularly preferred.

The liquid-crystal mixtures used according to the invention may contain further constituents which are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzylphenyl ethers, tolans and substituted cinnamic acids. The 1,4-phenylene groups in these compounds may also be fluorinated.

The liquid-crystal mixtures used in the electro-optical systems according to the invention preferably also contain one or more dielectrically neutral compounds of the formulae 1–5:

| | |
|---|---|
| R'-L-E-R" | 1 |
| R'-L-COO-E-R" | 2 |
| R'-L-OOC-E-R" | 3 |
| R'-L-CH₂CH₂-E-R" | 4 |
| R'-L-C≡C-E-R" | 5 |

In the formulae 1, 2, 3, 4 and 5, L and E, which may be identical or different, are in each case, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The liquid crystals according to the invention preferably contain one or more components selected from the compounds of the formulae 1, 2, 3, 4 and 5 in which L and E are selected from the group comprising Cyc, Phe and Pyr and simultaneously one or more components selected from the compounds of the formulae 1, 2, 3, 4 and 5 in which one of the radicals L and E is selected from the group comprising Cyc, Phe and Pyr and the other radical is selected from the group comprising -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group comprising -Phe-Cyc-, -Cyc-Cyc-, -G-Phe- and -G-Cyc-.

In the compounds of the sub-formulae 1, 2, 3, 4 and 5, R' and R" are in each case, independently of one another, preferably alkyl, alkenyl, alkoxy, alkenyloxy or alkanoyloxy having up to 8 carbon atoms. In most of these compounds, R' and R" are different from one another, one of these radicals being, in particular, alkyl, alkoxy or alkenyl.

The proportion by weight of the compounds of the formulae 1–5 in the liquid crystals used according to the invention is preferably 0–50% and in particular 0–40%.

The liquid-crystal mixtures used in the electrooptical systems according to the invention preferably contain 1–98%, in particular 5–95%, of compounds of the formula I. The liquid crystal mixture preferably contain 1–20, but in particular 1–15 and very particularly 1–12, compounds of the formula I.

A person skilled in the art can select, from the large pool of nematic or nematogenic substances, additives to the liquid-crystal mixtures described in such a manner that the birefringence Δn and/or the ordinary refractive index n$_o$ and/or other refractive indices and/or the viscosity and/or the dielectric anisotropy and/or further parameters of the liquid crystal are optimized with respect to the particular application.

The electrooptical systems according to the invention are characterized by favorable values for the threshold voltage and the stiffness of the electro-optical characteristic line and by high UV and heat stability, high contrast and in particular by a high HR —even at elevated temperatures and during UV irradiation —low solubility of the liquid-crystal mixture in the polymeric medium and high long-term stability.

The problems which occur on addressing microdroplet or network systems by means of an active matrix are solved better by the electrooptical system according to the invention than in arrangements of this type described hitherto.

In the case of microdroplet matrix systems, the precursor mixture preferably contains about 40–5 wt.% liquid crystal compounds. In the case of network systems, the precursor mixture preferably contains at least 70 wt.% liquid crystal compounds.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Federal Republic of Germany P 41 08 091.2, filed Mar. 13, 1991 and Federal Republic of Germany P 41 08 448.9, filed Mar. 13, 1991, are hereby incorporated by reference.

The examples below are intended to illustrate the invention, but do not represent a limitation.

EXAMPLES

Example 1

A liquid-crystal mixture containing
10% of 4-(trans-4-pentylcyclohexyl)benzonitrile
8% of 4-(trans-4-hexylcyclohexyl)benzonitrile
6% of 4-(trans-4-heptylcyclohexyl)benzonitrile
8% of 4-(trans-4-(trans-4-ethylcyclohexyl)cyclohexyl)-1-trifluoromethoxybenzene
12% of 4-(trans-4-(trans-4-propylcyclohexyl)cyclohexyl)-1-trifluoromethoxybenzene
7% of 4-(trans-4-(trans-4-butylcyclohexyl)cyclohexyl)-1-trifluoromethoxybenzene
11% of 4-(trans-4-(trans-4-pentylcyclohexyl)cyclohexyl1-trifluoromethoxybenzene
12% of 4-(trans-4-propylcyclohexyl)-3',4'-difluorobiphenyl
10% of 4-(trans-4-pentylcylohexyl)-3',4'-difluorobiphenyl
5% of 1-(trans-4-(trans-4-propylcyclohexyl)cyclohexyl)-2-(4-trifluoromethoxyphenyl)ethane
5% of 1-(trans-4-pentylcyclohexyl)cyclohexyl)-2-(4-trifluoromethoxyphenyl)ethane
2% of 2-fluoro-4-(trans-4-propylcyclohexyl)-4'-propylcyclohexylbiphenyl
2% of 2-fluoro-4-(trans-4-pentylcyclohexyl)-4'-propylcyclohexylbiphenyl and
2% of 2-fluoro-4-(trans-4-pentylcyclohexyl)-4'-pentylcyclohexylbiphenyl is stirred at room temperature with 1,6-hexanediol diacrylate, pentafluorophenyl methacrylate, dipentaerythritol pentaacrylate and benzil dimethyl ketal in a weight ratio of 50:37.5:5:5:2.5 until a clear solution is obtained. The solution is introduced, together with spacers (20 μm), between 2 transparent glass substrates provided with electrode layers, giving a uniform film having a thickness of 20 μm, which is cured by means of UV irradiation (30 W UV lamp). One of the electrode layers is in the form of an active TFT matrix, while the other electrode is the counterelectrode. After curing, the system has an HR of 92.5.

Example 2

The liquid-crystal mixture from Example 1 is stirred at room temperature with 1,6-hexanediol diacrylate, pentafluorobenzyl acrylate, dipentaerythritol pentaacrylate and 2-hydroxy-2-methyl-l-phenylpropan-1-one in the weight ratio 60:30:4:4:2 until a clear solution is obtained. The solution is introduced, together with spacers (20 μm), between 2 transparent glass substrates provided with electrode layers, giving a uniform film having a thickness of 20 μm, which is cured by means of UV irradiation (30 W UV lamp). One of the electrode layers is in the form of an active TFT matrix, while the other electrode is the counter-electrode. After curing, the system has a high HR.

Example 3

The liquid-crystal mixture from Example 1 is mixed at room temperature with hexanediol diacrylate, 1H,1H-heptafluorobutyl methacrylate, dipentaerythritol pentaacrylate and benzil dimethyl ketal in the weight ratio 50:32.5:10:5:2.5, and the mixture is introduced, together with spacers (20 μm), between 2 transparent glass substrates provided with electrode layers, giving a film having a thickness of 20 μm, which is cured by means of UV irradiation (30 W UV lamp). One of the electrode layers is in the form of an active TFT matrix, while the other electrode is the counterelectrode.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an electrooptical system comprising:
   two electrode layers, a liquid-crystal mixture and an optically transparent polymeric medium between said electrode layers, one of the electrode layers being formed as an active matrix having nonlinear addressing elements integrated into the pixel, while the other electrode layer forms the counterelectrode;
   wherein the liquid-crystal molecules of said liquid-crystal mixture have an irregular alignment in the switched-off state;
   wherein one of the refractive indices of said liquid-crystal mixture essentially corresponds to the refractive index $n_m$, of said polymeric medium and- /or wherein the quotient of the mass of said liquid-crystal mixture divided by the mass of said optically transparent polymeric medium is 1.5 or more; and wherein said system has reduced transmission in one of the two switching states compared with the other state, irrespective of the polarization of the incident light;

the improvement comprising:

said liquid-crystal mixture contains one or more compounds of the formula I

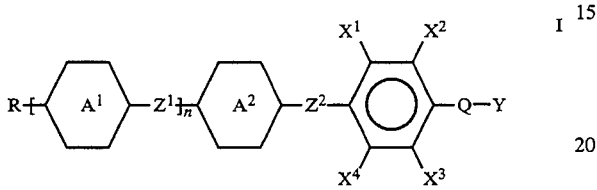

wherein $Z^1$ and $Z^2$ are each, independently, a single bond, —CH$_2$CH$_2$—, —COO—, —OCO— or —C≡C—,

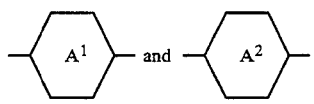

are each independently, trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

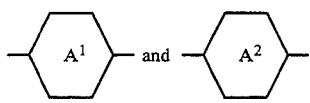

can also be pyrimidine-2,5-diyl, pyridine-2,5-diyl or trans-1,3-dioxane-2,5-diyl, $X^1$, $X^2$, $X^3$ and $X^4$ are each, independently, H or F, Q is CF$_2$, OCF$_2$, C$_2$F$_4$, OC$_2$F$_4$, or a single bond, Y is H, F or Cl n is 0, 1 or 2, and R is alkyl having up to 12 carbon atoms in which one or two non-adjacent CH$_2$ groups can be replaced by —O—and/or —CH=CH—; and to increase the solubility of said liquid-crystal mixture in the precursor of said polymeric medium, said precursor contains 0.1%–95.0% of a component A, wherein component A comprises one or more fluorinated, oligofluorinated, or perfluorinated monomers, one or more fluorinated, oligofluorinated, or perfluorinated oligomers one or more fluorinated, oligofluorinated, or perfluorinated prepolymers, or combinations thereof.

2. An electrooptical system according to claim 1, wherein component A is based on monomers, oligomers and/or prepolymers which contain a structural element of formula II

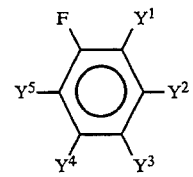

wherein up to 4 of the radicals $Y^1$–$Y^5$ are each, independently, H or F; at least one and up to 4 of the radicals $Y^1$–$Y^5$ are each, independently, a single bond or an alkylene group having 1–30 carbon atoms in which 1–15 CH$_2$ groups can each be replaced by —O—, —CO—, —COO—, —OCO—, —S—, —CHhalogen—, —C(halogen)$_2$— or substituted or unsubstituted, saturated or aromatic, cyclic diyl groups, where O and/or S are not linked directly to one another; and up to 3 of the radicals $Y^1$–$Y^5$ are each, independently, an alkyl group having 1–30 carbon atoms in which 1–15 CH$_2$ groups can be replaced by —O—, —CO—, —COO—, —OCO—, —S—, —CHhalogen—, —C(halogen)$_2$— or substituted or unsubstituted, saturated or aromatic, cyclic 1,4-diyl groups, where O and/or S are not linked directly to one another.

3. An electrooptical system according to claim 1, wherein component A is based on monomers, oligomers and/or prepolymers which contain a structural element of formula III

wherein up to 2 of $Y^6$, $Y^7$ and $Y^8$ are each independently H or F, at least one and up to 3 of the radicals $Y^6$–$Y^8$ are each, independently, a single bond or an alkylene group having 1–30 carbon atoms, in which 1–15 CH$_2$ groups can each be replaced by —O—, —CO—, —COO—, —OCO—, —S—, —CHhalogen—, —C(halogen)$_2$— or substituted or unsubstituted, saturated or aromatic, cyclic diyl groups, where O and/or S are not linked directly to one another; and up to 2 of the radicals $Y^6$–$Y^8$ are each, independently an alkyl group having 1–30 carbon atoms in which 1–15 CH$_2$ groups can be replaced by —O—, —CO—, —COO—, —OCO—, —S—, —CHhalogen—, —C(halogen)$_2$— or substituted or unsubstituted, saturated or aromatic, cyclic diyl groups, where O and/or S are not linked directly to one another.

4. An electrooptical system according to claim 1, wherein, to achieve low solubility of said liquid-crystal mixture in said polymeric medium, at least some of said monomers, oligomers and/or prepolymers of component A contain 3 or more linking points, and/or in which said precursor contains 0.1%–75.0% of a component B, wherein component B comprises one or more monomers, oligomers and/or prepolymers having at least 3 linking points.

5. An electrooptical system according to claim 2, wherein, to achieve low solubility of said liquid-crystal mixture in said polymeric medium, at least some of said monomers, oligomers and/or prepolymers of component A contain 3 or more linking points, and/or in which said precursor contains 0.1%-75.0% of a component B, wherein component B comprises one or more monomers, oligomers and/or prepolymers having at least 3 linking points.

6. An electrooptical system according to claim 4, wherein said monomers, oligomers and/or prepolymers of components A and B contain groups which can be photopolymerized by means of free radicals and/or cations.

7. An electrooptical system according to claim 5, wherein said monomers, oligomers and/or prepolymers of components A and B contain groups which can be photopolymerized by means of free radicals and/or cations.

8. A mixture for the production of an electrooptical system comprising:
(a) a liquid-crystal mixture containing at least one compound of the formula I

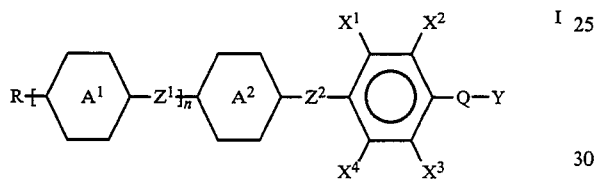

wherein
$Z^1$ and $Z^2$ are each, independently, a single bond, —$CH_2CH_2$—, —COO—, —OCO— or —C≡C—,

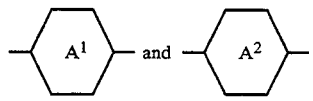

are each independently, trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

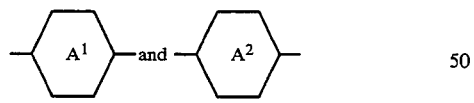

can also be pyrimidine-2,5-diyl, pyridine-2,5-diyl or trans-1,3-dioxane-2,5-diyl,
$X^1$, $X^2$, $X^3$ and $X^4$ are each independently, H or F,
Q is $CF_2$, $OCF_2$, $C_2F_4$, $OC_2F_4$, or a single bond,
Y is H, F or Cl,
n is 0, 1 or 2, and
R is alkyl having up to 12 carbon atoms in which one or two non-adjacent $CH_2$ groups can be replaced by —O— and/or —CH=CH—; and
(b) a precursor of an optically transparent polymeric medium comprising component A and component B, wherein component A contains one or more fluorinated oligofluorinated, or perfluorinated monomers, one or more fluorinated, oligofluorinated, or perfluorinated oligomers, or one or more fluorinated, oligofluorinated, or perfluorinated prepolymers, or combinations thereof, and wherein component B contains one or more monomers, oligomers and/or prepolymers having at least 3 linking points.

9. In the method for production of an electrooptical system comprising:
two electrode layers, a liquid-crystal mixture and an optically transparent polymeric medium between said electrode layers, one of the electrode layers being formed as an active matrix having nonlinear addressing elements integrated into the pixel, while the other electrode layer forms the counterelectrode;
wherein the liquid-crystal molecules of said liquid-crystal mixture have an irregular alignment in the switched-off state;
wherein one of the refractive indices of said liquid-crystal mixture essentially corresponds to the refractive index $n_m$, of said polymeric medium and-/or herein the quotient of the mass of said liquid-crystal mixture divided by the mass of said optically transparent polymeric medium is 1.5 or more; and
wherein said system has reduced transmission in one of the two switching states compared with the other state, irrespective of the polarization of the incident light;
the improvement comprising positioning a mixture according to claim 8 between said electrode layers and curing said precursor of said polymeric medium.

10. An electrooptical system according to claim 1, wherein said liquid-crystal mixture contains one or more bicyclic compounds of formula I2

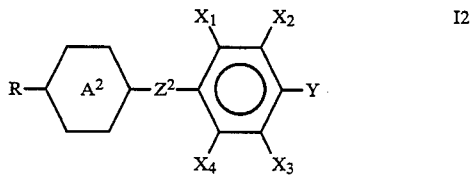

wherein
R is alkyl having up to 12 carbon atoms in which one or two non-adjacent $CH_2$ groups can be replaced by —O—and/or —CH=CH—;

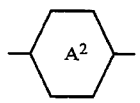

is trans-1,4-cyclohexylene, 1,4-phenylene, 2-fluoro-1,4-phenylene, 3-fluoro-1,4-phenylene, 2,3-difluoro-1,4-phenylene, or 3,5-difluoro-1,4-phenylene, and

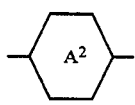

can also be pyrimidine-2,5-diyl, pyridine-2,5-diyl or trans-1,3-dioxane-2,5-diyl;

$Z^2$ is a single bond, —$CH_2CH_2$—, —COO—, —OCO— or —C≡C—;

$X^1$, $X^2$, $X^3$ and $x^4$ are each, independently, H or F; and

Y is H, F or Cl.

11. An electrooptical system according to claim 10, wherein R is a straight-chain alkyl group having 1–10 C atoms or a straight-chain alkoxy having 1–10 C atoms, $Z^2$ is —$CH_2CH_2$—, —COO— or a single bond, $X^1$ is H, $X^2$ is H, $X^3$ is F, Y is —F, —Cl, —$OCHF_2$, —$OCF_3$ or —$CF_3$, and

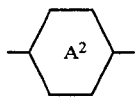

is trans-1,4-cyclohexylene, 1,4-phenylene which is unsubstituted or 2- or 3-monofluorinated, 3,5-difluoro-4-phenylene, 2,3-difluoro-1,4-phenylene, pyrimidine-2,5-diyl, or pyridine-2,5-diyl.

12. An electrooptical system according to claim 10, wherein R is n-alkoxymethyl or n-alkoxyethyl.

13. An electrooptical system according to claim 1, wherein said liquid crystal mixture contains one or more tricyclic compounds of formula I3

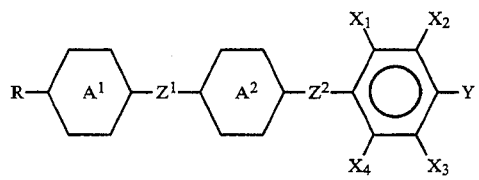

is alkyl having up to 12 carbon atoms in which one or two non-adjacent $CH_2$ groups can be replaced by —O— and/or —CH=CH—;

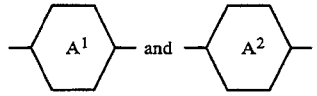

are each, independently, trans-1,4-cyclohexylene, 1,4-phenylene, 2-fluoro-1,4phenylene, 3-fluoro-1,4-phenylene 2,3-difluoro-1,4-phenylene or 3,5-difluoro-1,4-phenylene, and one of

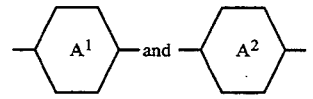

can also be pyrimidine-2,5-diyl, pyridine-2,5-diyl or trans-1,3-dioxane-2,5-diyl;

$Z^1$ and $Z^2$ are each, independently, a single bond, —$CH_2CH_2$—, —COO—, —OCO— or —C≡C—;

$X^1$, $X^2$, $X^3$ and $X^4$ are each, independently, H or F; and

Y is H, F or Cl

14. An electrooptical system according to claim 13, wherein R is n-alkyl having 1–10 carbon atoms, n-alkoxy having 1–10 carbon atoms, n-alkoxymethyl having 1–8 carbon atoms, n-alkoxyethyl having 1–8 carbon atoms, or n-alkenyl having up to 7 carbon atoms, $Z^1$ and $Z^2$ are each, independently, —$CH_2CH_2$—, —COO—, or a single bond, Y is —F, —Cl, —$OCHF_2$, —$OCF_3$ or —$CF_3$, $X^4$ is H, at least one of $X^1$, $X^2$ and $X^3$ is F, and

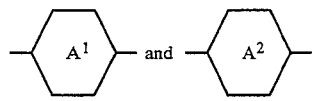

are each, independently, trans-1,4 -cyclohexylene, 1,4-phenylene which is unsubstituted or 2- or 3-monofluorinated, 3,5-difluoro-1,4-phenylene, 2,3-difluoro-1,4-phenylene, pyrimidine-2,5-diyl, or pyridine-2,5-diyl.

15. An electrooptical system according to claim 1, wherein said liquid-crystal mixture contains one or more tetracyclic compounds of formula I4

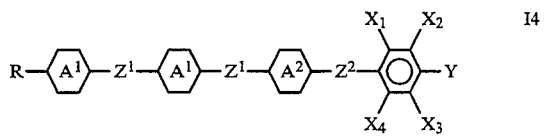

wherein

R is alkyl having up to 12 carbon atoms in which one or two non-adjacent $CH_2$ groups can be replaced by —O— and/or —CH=CH—; and

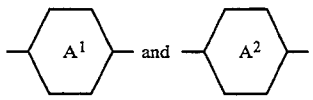

are each, independently, trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

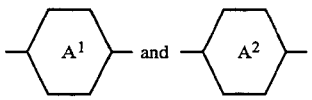

can also pyrimidine-2,5-diyl; pyridine-2,5-diyl or trans-1,3-dioxane-2,5-diyl;

$X^1$, $X^2$, $X^3$ and $X^4$ are each, independently, H or F, and

Y is H, F or Cl.

16. An electrooptical system according to claim 15, wherein R is n-alkyl having 1–10 carbon atoms, n-alkoxy having 1–10 carbon atoms, n-alkoxymethyl having 1–8 carbon atoms, or n-alkoxyethyl having 1–8 carbon atoms, one of the $Z^1$ and $Z^2$ groups is not a single bond, and

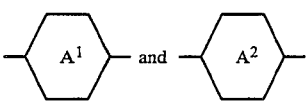

are each, independently, trans-1,4-cyclohexylene, 2-fluoro-1,4-phenylene, 3-fluoro-1,4-phenylene, 1,4-phenylene, pyrimidine-2,5-diyl, or pyridine-2,5-diyl.

17. An electrooptical system according to claim 2, wherein said structural element of formula II is a terminal group wherein one of the radicals $Y^1$ to $Y^5$ is an alkylene group or a single bond which connects said structural element of formula II to a polymerizable radical.

18. An electrooptical system according to claim 2, wherein said structural element of formula II is a non-terminal group wherein at least two of the radicals $Y^1$ to $Y^5$ are each, independently, an alkylene group or a single bond which connect said structural element of formula II to a polymerizable radical.

19. An electrooptical system according to claim 3, wherein said structural element of formula III is a terminal group wherein one of the radicals $Y^6$ to $Y^8$ is an alkylene group or a single bond which connects said structural element of formula III to a polymerizable radical.

20. An electrooptical system according to claim 3, wherein said structural element of formula III is a nonterminal group wherein at least two of the radicals $Y^6$ to $Y^8$ are each, independently, an alkylene group or a single bond which connect said structural element of formula III to a polymerizable radical.

21. An electrooptical system according to claim 1, wherein said liquid-crystal mixture contains 1–98% of compounds of formula I.

22. An electrooptical system according to claim 1, wherein said liquid-crystal mixture contains not more than 15% of nitrile compounds.

23. An electrooptical system according to claim 1, wherein said liquid-crystal mixture contains not more than 10% of nitrile compounds.

24. An electrooptical system according to claim 1, wherein the combination of said liquid-crystal mixture and precursor contains 40–85% of liquid-crystal compounds.

25. An electrooptical system according to claim 1, wherein the combination of said liquid-crystal mixture and precursor contains at least 70% of liquid-crystal compounds.

26. An electrooptical system according to claim 1, wherein component A consists of one or more fluorinated, oligofluorinated, or perfluorinated monomers, oligomers and/or prepolymers.

27. An electrooptical system according to claim 1, wherein Q-Y is F, Cl, $OCHF_2$, $OCF_3$ or $CF_3$.

28. An electrooptical system according to claim 1, wherein Q is $CF_2$, $OCF_2$, $C_2F_4$ or $OC_2F_4$.

29. An electrooptical system according to claim 1, wherein Y is F or Cl.

* * * * *